United States Patent [19]

Oshima et al.

[11] Patent Number: 5,704,803
[45] Date of Patent: Jan. 6, 1998

[54] BATTERY PACK AND THE METHOD OF ITS MANUFACTURE

[75] Inventors: Tsutomu Oshima, Tokyo; Katsumi Tanaka, Tama; Kikuo Kojima, Yokohama, all of Japan

[73] Assignee: The Whitaker Corporation, Wilmington, Del.

[21] Appl. No.: 608,262

[22] Filed: Feb. 28, 1996

[30] Foreign Application Priority Data

Mar. 1, 1995 [JP] Japan ................................ 7-067123

[51] Int. Cl.$^6$ ........................................................ H01R 3/00
[52] U.S. Cl. .............................. 439/500; 429/96; 429/99; 429/100
[58] Field of Search ................................ 439/500, 660, 439/79; 429/53, 86, 96–100, 174, 176, 185

[56] References Cited

U.S. PATENT DOCUMENTS

| | | |
|---|---|---|
| 1,778,171 | 10/1930 | Snyder ................................ 429/100 |
| 2,582,072 | 1/1952 | Schwinn .............................. 429/100 |
| 4,160,857 | 7/1979 | Nardella et al. ........................ 429/99 |
| 5,436,088 | 7/1995 | Castaneda et al. ...................... 429/96 |

FOREIGN PATENT DOCUMENTS

| | | |
|---|---|---|
| 304552 | 11/1993 | Japan . |
| 316182 | 11/1993 | Japan . |
| 320255 | 12/1993 | Japan . |
| 335995 | 12/1993 | Japan . |
| 37876 | 2/1994 | Japan . |

Primary Examiner—J. J. Swann

[57] ABSTRACT

The Battery pack of the present invention consists of the upper half 10 and lower half 60 which can be joined to each other. The upper half 10 comprises an elastic rubber gasket 20 which is integrally molded into the upper half 10. The elastic rubber gasket 20 has a sealing section 21 providing for water-proof characteristics and passage sections 22 providing for gas release. The sealing section 21 comes in contact with the sealing surface 62 of the lower half 60, thus providing for water-proof joining of the upper half 10 and the lower half 60. The purpose of the gas release sections 22 is to allow venting of gas generated during the recharging of the batteries.

9 Claims, 2 Drawing Sheets

BATTERY PACK AND THE METHOD OF ITS MANUFACTURE

FIELD OF THE INVENTION

This invention relates to battery packs and the methods of their manufacturing, and specifically to battery compartments mounted in portable communications and other type devices requiring a water-proof design.

BACKGROUND OF THE INVENTION

Many electronic devices intended for portable use, such as portable telephones, video cameras, etc., are currently designed to incorporate rechargeable batteries. These rechargeable batteries can be either built into the water-proof housing of the device, or can be disposed in a separate removable water-proof case to allow recharging by connection of a charging unit to the device.

Battery packs made as removable units in the form of a case containing batteries must have good water-proof characteristics, and at the same time they must have features making it possible to release gases generated during the recharging process from the case.

Conventional battery packs have rather complicated designs which make their production labor intensive. There is a need for a battery pack of a simple design which can provide a waterproof case allowing the release of gases generated by the batteries during recharging.

Therefore, the object of this invention is to offer a battery pack of a relatively simple design providing for an easy manufacturing process, and having good water-proof properties and gas permeability.

SUMMARY OF THE INVENTION

The object of this invention is accomplished by providing a battery pack having a case which consists of two halves. A first half containing a cavity into which the batteries are placed and a second half having a dielectric substance providing for gas permeability between its inside and outside surfaces and a waterproof elastic rubber gasket made as an integral part thereof.

This invention also provides a method of manufacturing of the battery pack consisting of the method of the manufacturing of the first half in the form of a mold made of a resin in the shape of a tray with a cavity made in the center, the method of manufacturing of the second half which is molded from a second resin providing for gas permeability between the inside and the outside surfaces as an integral part with a water-proof rubber gasket, and an assembly process involving the installation of the batteries into the cavity of the first half and the installation of the second half to provide a water-proof battery pack.

The battery pack according to this invention is designed as a battery containing case consisting of upper and lower halves fitting to each other.

One of the halves, (upper or lower) has a gasket made of elastic rubber which is an integral part of the body made of a resin. The elastic rubber acts as a water-proof seal and also serves as a passage for the release of gas.

The other half is made in the form of a tray with a cavity in its center, and it has electrical terminals embedded in the resin of the half as an integral part. The terminals are arranged in such a way that they provide for the connection of batteries and all necessary sensors. In a portion of a wall made of the resin, windows are provided for the access to the electric terminals from the outside. The terminals are embedded in the wall of the half in a water-proofed manner.

This half also has a seal fitting surface. When the upper and the lower halves are fixed to each other, the seal fitting surface comes against the elastic rubber seal. This provides for a water-proof connection resulting in a water-proof case containing batteries. And since the elastic rubber contains gas passages, hydrogen and other gases generated during the recharging of the batteries are released through the elastic rubber.

BRIEF DESCRIPTION OF THE DRAWINGS

Embodiments of the invention will now be described by way of example with reference to the accompanying drawings of which.

DETAILED DESCRIPTION OF THE INVENTION

Figure 1:
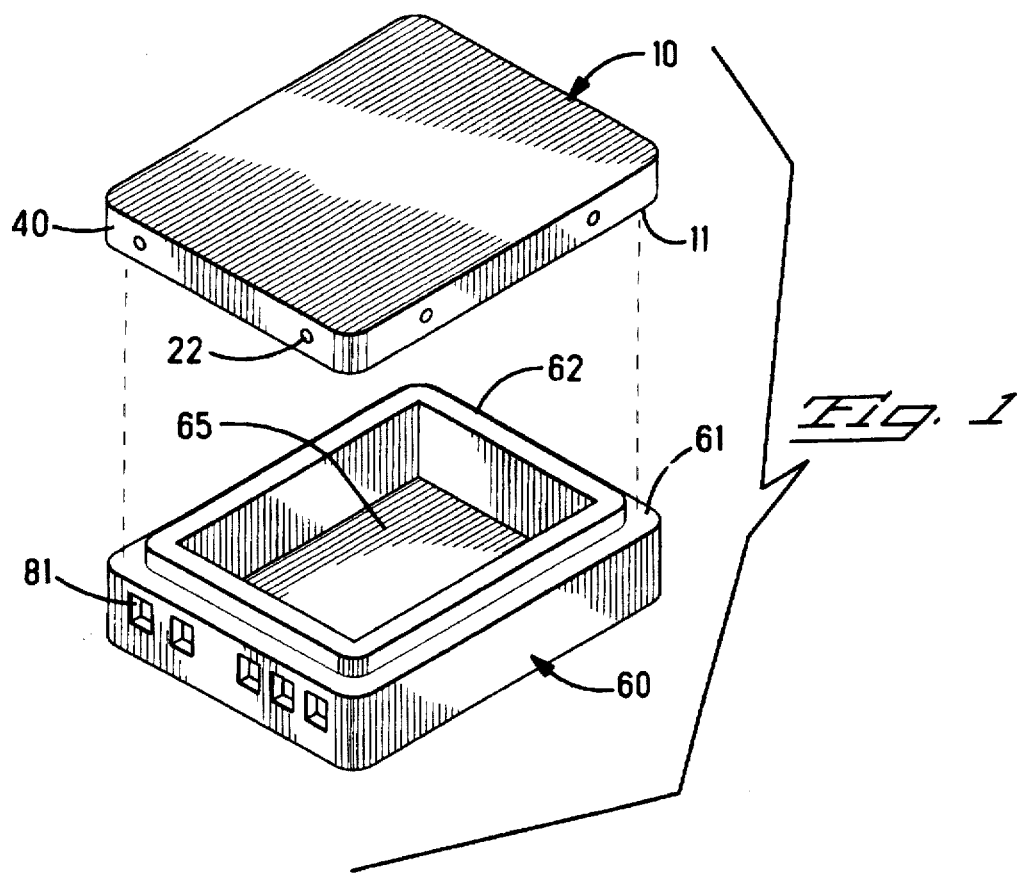
FIG. 1 shows a three-dimensional view of the first embodiment of the battery pack according to this invention.

FIG. 1 represents a three-dimensional view of the upper half 10 and the lower half 60 of the first embodiment of the battery pack according to this invention. The upper half 10 and the lower half 60 fit each other, and the lower half 60 has a cavity 65. Together, the upper half 10 and the lower half 60 form a battery case which can accommodates batteries.

Figure 2:
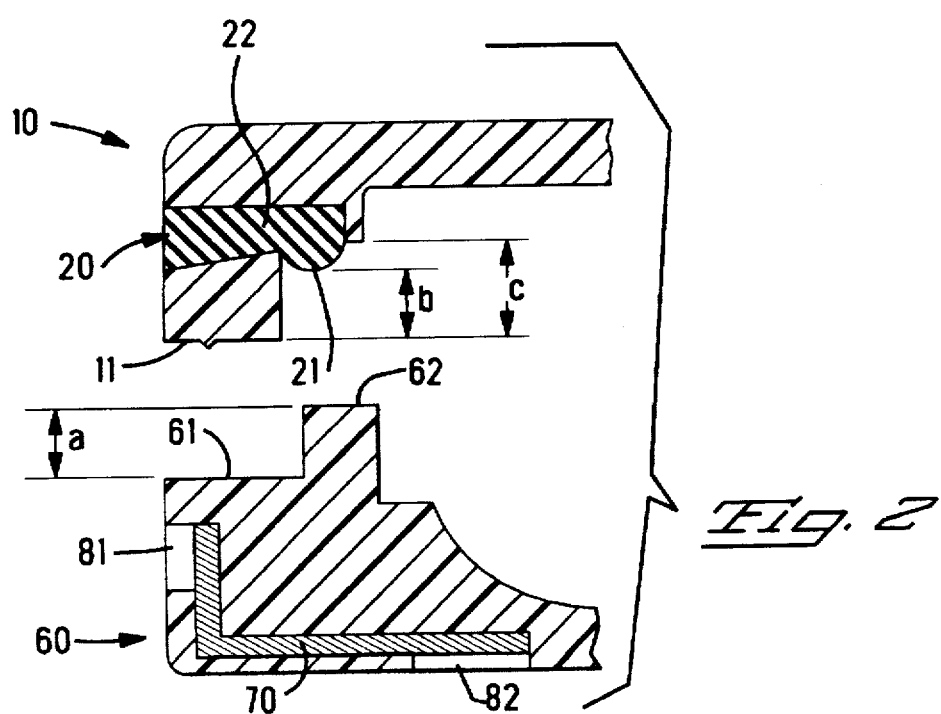
FIG. 2 shows a partial cross section of the battery pack shown in FIG. 1.

FIG. 2 is a partial cross section of the upper half 10 and the lower half 60 depicted in FIG. 1. As can be seen from the drawing, electric terminals 70 are integrally molded into the lower half 60 by insert molding. It is not shown in the drawing, but the electric terminals 70 extend to the cavity 65 of the lower half 60 where they can be connected to the batteries or sensors. In addition, as can be seen from FIGS. 1 and 2, the access to the electric terminals 70 is provided through windows 81, 82. This makes it possible to access the terminals 70 for electrical connection, without impairing the water-proof properties of the battery pack. Windows 81, 82 are also used for the purpose of the mounting the battery pack in the device it is used in, and as a means of the connection of the electric terminals 70 to appropriate terminals of the device. In the upper portion of the wall of the lower half 60, a surface 61 for the joining of the upper half 10, and a surface 62 for the seal are provided. After the batteries and other devices are placed in the cavity 65 of the lower half 60, the upper half 10 is affixed to it, thus completing the assembly of the battery pack.

As can be seen from FIG. 2, the elastic rubber gasket 20 is integrally molded into the upper half 10. The elastic rubber 20 consists of a seal section 21 and a passage section 22 which penetrates through the upper half wall. The bottom surface of the upper half 10 has a contact edge 11 for an appropriate joining to the lower half 60.

When the upper half 10 and the lower half 60 of the embodiment shown in FIGS. 1 and 2 are joined together, the contact edge 11 of the upper half 10 comes against the joining surface 61 of the lower half 60. Both halves 10 and 60 are then bonded together by appropriate means such as ultrasonic welding.

Dimensions shown in FIG. 2 are as follows: "a" is the difference in height of the sealing surface 62 and of the joining surface 61; "b" is the difference in height of the bottom edge of the elastic rubber gasket 20 and the contact edge 11; and "c" is the difference in height of the surface 12 and the contact edge 11. The relationship between these dimensions is: "b"<"a"<"c". Therefore, when the contact edge 11 and the joining surface 61 are joined and connected, the sealing surface 62 comes in contact with the sealing section 21 of the elastic rubber gasket 20, thus providing a water-proof connection. The passage sections 22 of the elastic rubber gasket 20 are provided at selected locations of the upper half 10 (see FIG. 1); these sections are exposed on the both sides and communicate with the inside and outside of the upper half 10. Therefore, gas can pass through the elastic rubber gasket 20 from the inside of the case to the outside. These passage sections 22 also act as retainers to keep the elastic rubber gasket 20 attached to the upper half 10.

Figure 3:
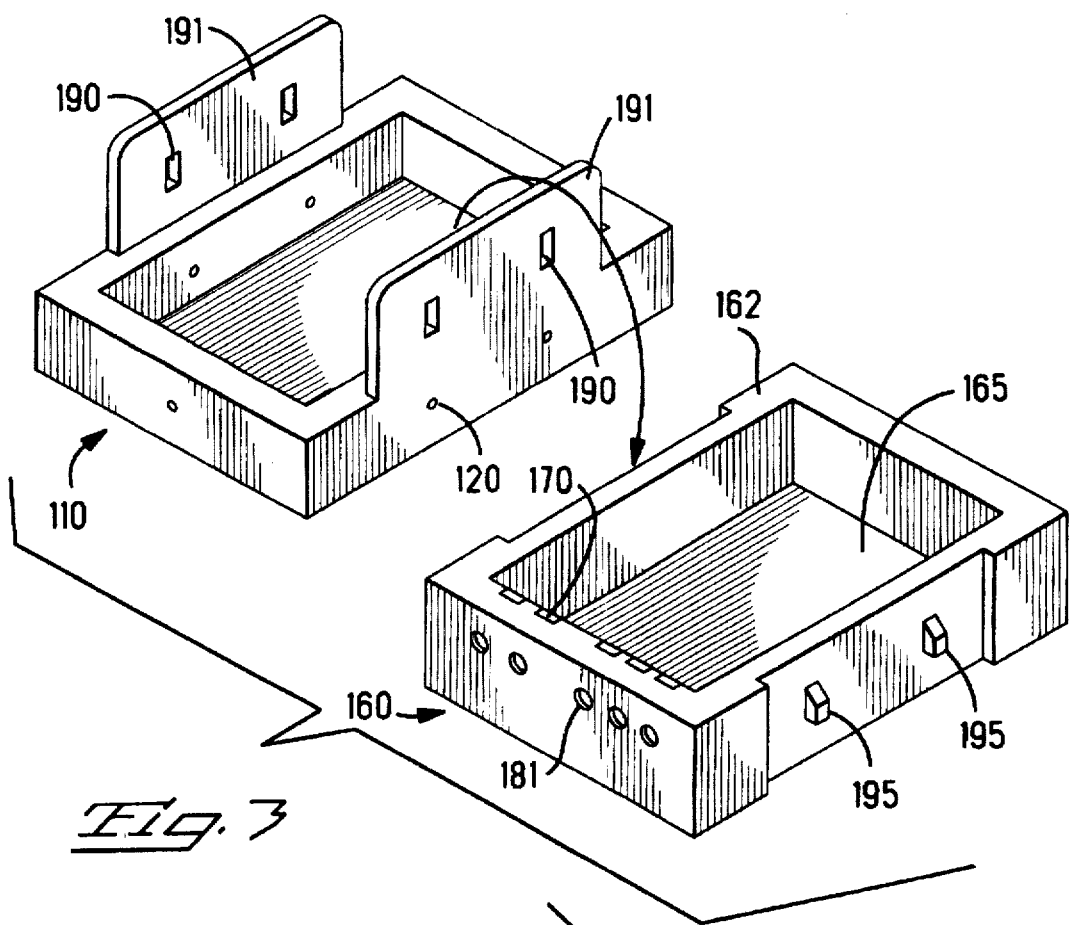
FIG. 3 shows a three-dimensional view of the second preferred embodiment of the battery pack according to this invention.

FIG. 3 is a three-dimensional view of the upper half 110 and the lower half 160 used in the battery pack according to the second embodiment of this invention. In FIG. 3, the upper half 110 is shown in an upside down position.

Electrical terminals 170 of the lower half 160 are integrally molded into the lower half 160, and they extend (which is not shown in the drawing) inside the cavity 165 where they form electrical connections with batteries and sensors. In order to provide access to the electrical terminals 170 from outside, windows 181 are provided in the resin body 180 at desirable locations. The upper surface of the lower half 160 is formed as a sealing surface 162. After batteries and other devices are placed inside the lower half 160, it is joined with the upper half 110, thus completing the battery pack. As can be seen from FIG. 3, and similar to the first embodiment, the elastic rubber gasket 120 is integrally molded into the upper half 110.

The second embodiment is different from the first embodiment in that a locking means is provided for the connection of the upper half 110 and the lower half 160. As shown is in FIG. 3, the upper half 110 is equipped with flaps 191 having latching eyelets 190, and the lower half 160 has matching projections 195. The upper half 110 is secured on the lower half 160 when the latching eyelets 190 are engaged with the projections 195.

Figure 4:
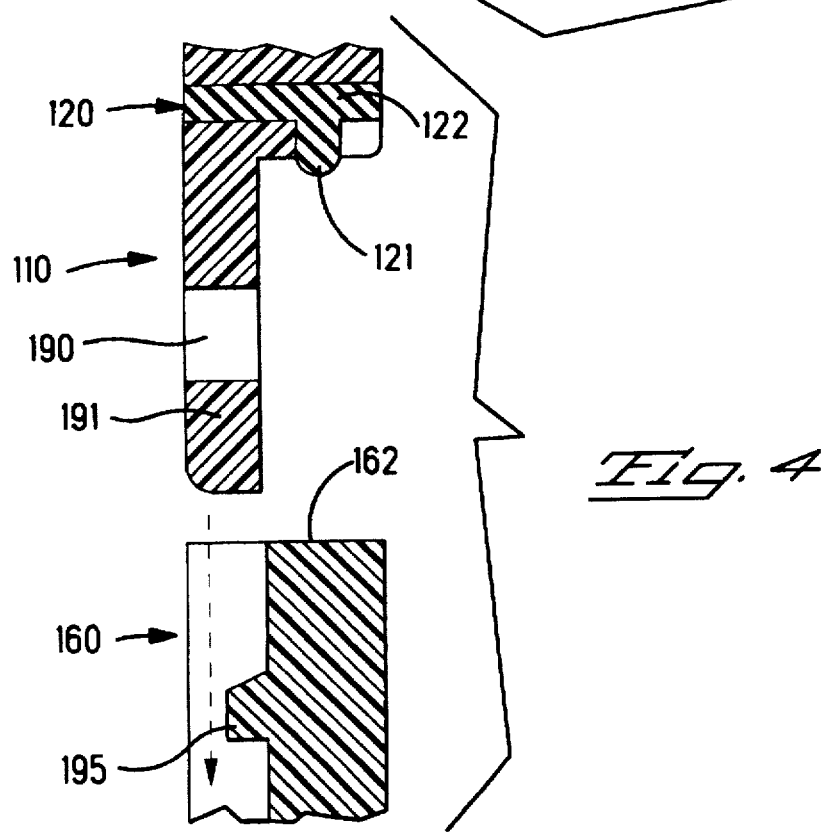
FIG. 4 shows a partial cross section of the battery pack shown in FIG. 3.

FIG. 4 represents a partial cross section of the upper half 110 and the lower half 160 depicted in FIG. 3. As it was mentioned above, the elastic rubber gasket 120 is made as an integral part of the upper half 110. The elastic rubber gasket 120 consists of a sealing section 121 and a passage section 122. When the eyelets 190 of the flaps 191 are engaged with the projections 195, the upper half 110 and the lower half 160 are connected together, and the sealing section 121 of the elastic rubber gasket 120 are in contact with the sealing surface 162 of the lower half 160, and a water-proof connection is provided. The passage sections 122 placed in the openings 120 of the upper half 110 provide outlets for the release of gas. These passage sections 122 also act as retainers for keeping the elastic rubber gasket 120 attached to the upper half 110.

Examples of resin materials used for the manufacture of the first and the second embodiments, are polycarbonates or modified PRE. An example of the material used for the elastic rubber gasket is LSR (Liquid Silicone Rubber) with a Shore A hardness value between 10 and 70.

It should be remembered that the invention is not limited to the examples provided here only, but it also comprises all changes and modifications which can be made by one of ordinary skill in the art. For example, the passage sections 22 and 122 in the first and the second embodiments have round cross sections (see FIGS. 1 and 3), but they can be also made in the form of wide openings or rectangular openings.

The advantage of this invention is that both water-proof and gas release characteristics are embodied in one part which provides considerable economical benefits. The manufacturing process of this pack involves the placement of batteries in one of the halves and joining it with the other half. This makes the process of manufacture simple with an easily maintained productivity and accuracy.

We claim:

1. A watertight housing for receiving a battery comprising:

a first half having a bottom wall, a plurality of side walls extending from the bottom wall, the side walls being continuous with each other at each of a plurality of corners to form an open ended closure for receiving the battery, each of the side walls having a top sealing surface at an end opposite the bottom wall, and electrical contacts disposed inside the closure and in communication with an outer surface of the closure, and;

a second half being secured to the first half by ultrasonic welding to form the watertight housing, the second half having a seal disposed on an inner surface and inside at least one opening extending from the inner surface to an outer surface, the seal being cooperable with the sealing surface of the first half to prevent water from entering the housing while allowing gas to pass from the inside to the outside of the housing.

2. A watertight housing as recited in claim 1 wherein the seal and the second half are integrally molded.

3. A watertight housing as recited in claim 1 wherein the first and second halves are formed of a resin material.

4. A watertight housing as recited in any of claims 1–3 wherein one of the first or second halves further comprises at least one latch and the other of the first or second halves further comprises at least one latching projection for latchably engaging the at least one latch, whereby the first and second halves are secured to each other by engagement of the at least one latch with the at least one latching projection.

5. A closure half for being ultrasonically welded with an open ended closure half having a sealing surface and a joining surface comprising:

an inner surface facing the open ended closure half, an outer surface opposite the inner surface, a contact surface being engagable with the joining surface of the open ended closure half, and;

a seal disposed along the inner surface and extending through at least one opening in the closure half which passes from the inner surface to the outer surface, whereby the seal allows passage of gas from the inner surface toward the outer surface through the at least one opening but does not allow passage of water from the outer surface to the inner surface.

6. A closure half as recited in claim 5 wherein the seal is integrally molded with the closure half.

7. A closure half as recited in claim 5 wherein the closure half is formed of a resin material.

8. A closure half as recited in any of claims 5–7 further comprising at least one latch for latchably engaging at least one latching projection on the open ended closure, whereby the closure half and the open ended closure are secured to each other by engagement of the latch with the latching projection.

9. A closure half as recited in any of claims 5–7 further comprising at least one latching projection for latchably engaging at least one latch on the open ended closure, whereby the closure half and the open ended closure are secured to each other by engagement of the latch with the latching projection.

* * * * *